United States Patent
Peng et al.

(10) Patent No.: US 9,882,787 B2
(45) Date of Patent: Jan. 30, 2018

(54) SERVICE MANAGEMENT IN APPLIANCE-BASED SOLUTIONS

(71) Applicant: LENOVO ENTERPRISE SOLUTIONS (SINGAPORE) PTE. LTD., Singapore (SG)

(72) Inventors: Xuhan Peng, Beijing (CN); Susette Townsend, Rochester, MN (US)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 640 days.

(21) Appl. No.: 14/150,988

(22) Filed: Jan. 9, 2014

(65) Prior Publication Data

US 2015/0195151 A1    Jul. 9, 2015

(51) Int. Cl.
| | |
|---|---|
| H04L 12/24 | (2006.01) |
| H04L 29/08 | (2006.01) |
| H04L 12/26 | (2006.01) |
| G06F 9/50 | (2006.01) |

(52) U.S. Cl.
CPC ........ *H04L 41/5041* (2013.01); *G06F 9/5005* (2013.01); *H04L 43/10* (2013.01); *H04L 67/1012* (2013.01); *H04L 67/1014* (2013.01); *H04L 67/16* (2013.01)

(58) Field of Classification Search
None
See application file for complete search history.

(56) References Cited

U.S. PATENT DOCUMENTS

| | | | | |
|---|---|---|---|---|
| 5,774,642 | A  * | 6/1998 | Flon | G06F 11/2038 709/220 |
| 7,058,846 | B1 * | 6/2006 | Kelkar | G06F 11/2033 714/11 |
| 7,962,545 | B2 | 6/2011 | Knauerhase et al. | |
| 8,533,331 | B1 * | 9/2013 | Thaker | G06F 11/327 709/226 |
| 9,128,770 | B2 * | 9/2015 | Kondamuru | G06F 9/5083 |
| 9,235,448 | B2 * | 1/2016 | Kondamuru | G06F 9/5083 |
| 2006/0069946 | A1 * | 3/2006 | Krajewski, III | G06F 11/1658 714/4.1 |

(Continued)

OTHER PUBLICATIONS

Boris Lublinsky; The Architecture Journal—Journal 11; "Versioning in SOA", Microsoft Developer Network, Apr. 2007, pages 1-9, <http://msdn.microsoft.com/en-us/library/bb491124.aspx>.

"Package management system", Wikipedia, Nov. 4, 2013, pp. 1-7, retrieved Dec. 16, 2013, <http://en.wikipedia.org/wiki/Package_management_system>.

(Continued)

*Primary Examiner* — Ninos Donabed
(74) *Attorney, Agent, or Firm* — Patterson + Sheridan, LLP

(57) ABSTRACT

System, method, and computer program product to perform an operation comprising deploying a first appliance including at least one service to a computing environment including a plurality of appliances, determining, for each service in the first appliance, whether the service is active on at least one other appliance of the plurality of appliances in the computing environment, and activating, on the first appliance, only each service not determined to be active on at least one other appliance of the plurality of appliances, so that each service determined to be active in at least one other appliance of the plurality of appliances is not activated on the first appliance.

19 Claims, 6 Drawing Sheets

(56) References Cited

U.S. PATENT DOCUMENTS

| | | | | |
|---|---|---|---|---|
| 2008/0140760 A1* | 6/2008 | Conner | ............... | G06Q 50/10 709/201 |
| 2009/0113072 A1* | 4/2009 | Little | ............... | H04L 67/10 709/244 |
| 2010/0131620 A1* | 5/2010 | Kondamuru | ............... | G06F 9/5083 709/220 |
| 2010/0131630 A1* | 5/2010 | Kondamuru | ............... | G06F 9/5083 709/222 |
| 2011/0126207 A1 | 5/2011 | Wipfel et al. | | |
| 2013/0232470 A1* | 9/2013 | Yung | ............... | G06F 8/40 717/121 |
| 2013/0238768 A1* | 9/2013 | Vaidya | ............... | H04L 41/0846 709/220 |
| 2014/0201348 A1* | 7/2014 | Anantharam | ............... | G06F 9/45558 709/223 |
| 2014/0317716 A1* | 10/2014 | Chao | ............... | H04L 63/0815 726/9 |

OTHER PUBLICATIONS

Sapuntzakis et al.; "Virtual Appliances for Deploying and Maintaining Software", Oct. 2003, pp. 1-15, <http://people.csail.mit.edu/nickolai/papers/sapuntzakis-deploying.pdf>.

Apte et al.; "Look Who's Talking: Discovering Dependencies between Virtual Machines Using CPU Utilization", HotCloud 2010 Conference, pp. 1-7, <http://static.usenix.org/event/hotcloud10/tech/full_papers/Apte.pdf>.

Ian Shields; "Learn Linux, 101: RPM and YUM package management", May 11, 2010, pp. 1-16 <http://www.ibm.com/developerworks/linux/library/I-Ipic1-v3-102-5/>.

"Dependency hell", Wikipedia, Sep. 7, 2013, pp. 1-5, retrieved Dec. 16, 2013, <http://en.wikipedia.org/wiki/Dependency_hell#Solutions>.

"Open Virtualization Format Specification", Distributed Management Task Force, Inc., Dec. 13, 2012, pp. 1-65 <http://www.dmtf.org/sites/default/files/standards/documents/DSP0243_2.0.0.pdf>.

U.S. Appl. No. 14/251,131, entitled Service Management in Appliance-Based Solutions, filed Apr. 11, 2014.

* cited by examiner

200

| Service 201 | Version 202 | Appliance 203 | State 204 | State change 205 | Relationship/Dependencies 206 |
|---|---|---|---|---|---|
| K | 2 | D | Active | | Appliance D requires at least service K v2 to be active; Service K v2 depends on service L v2 |
| L | 2 | B | Active | | Appliance B requires at least service L v2 and service M v1 to be active |
| M | 1 | B | Active | | Appliance B requires at least service L v2 and service M v1 to be active |
| K | 1 | C | Inactive | Can become active when appliance D is down or removed | Appliance C requires at least service K v1 and service L v1 to be active |
| L | 2 | A | Inactive | Can become active when appliance B is down or removed | Appliance A requires service L v2 to be active |
| L | 1 | C | Inactive | Can become active when appliances A and B are down or removed | Appliance C requires at least service K v1 and service L v1 to be active |
| L | 1 | E | Inactive | Can become active when appliances A, B, and C are down or removed | Appliance E requires at least service L v1 to be active |

FIG. 2

SERVICE MANAGEMENT IN APPLIANCE-BASED SOLUTIONS

BACKGROUND

Embodiments disclosed herein relate to the field of computer software. More specifically, embodiments disclosed herein provide service management in appliance-based solutions.

Today, appliance delivery of software services can be structurally complex and large scale, or small and disconnected. The integration of small and simple appliances which provide specialized services to create a larger solution brings new problems, such as managing different versions of these services as the solution evolves, as the services are fundamentally replaced over time when adding or removing appliances from the solution.

SUMMARY

Embodiments disclosed herein include a system, method, and computer program product to perform an operation comprising deploying a first appliance including at least one service to a computing environment including a plurality of appliances, determining, for each service in the first appliance, whether the service is active on at least one other appliance of the plurality of appliances in the computing environment, and activating, on the first appliance, only each service not determined to be active on at least one other appliance of the plurality of appliances, so that each service determined to be active in at least one other appliance of the plurality of appliances is not activated on the first appliance.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings.

It is to be noted, however, that the appended drawings illustrate only typical embodiments of this disclosure and are therefore not to be considered limiting of its scope, for the disclosure may admit to other equally effective embodiments.

FIG. 2 illustrates a topology data, according to one embodiment.

DETAILED DESCRIPTION

Embodiments disclosed herein utilize techniques to manage and maintain the services provided by each appliance in a multi-appliance integrated solution, as well as maintain the relationships between different services. Generally, embodiments disclosed herein define one or more rules and relationships for each service and/or appliance in order to facilitate the addition and removal of different appliances (and their corresponding services) with a computing environment. For example, if appliance X executes service A in a computing environment, and appliance Y, which also includes service A, is deployed in the same computing environment, embodiments disclosed herein ensure that service A is only activate on one of appliance X and appliance Y, but not both. In order to do so, the instance of service A on may not be activated on appliance Y, or the instance of service A may be deactivated on appliance X and activated on appliance Y. In at least some embodiments, performance metric data for the appliances are considered in determining which appliance should host the active instance of service A. If the appliance X or Y hosting the active version of service A is subsequently removed from the computing environment, embodiments disclosed herein ensure that service A is still executing in the computing environment by activating the inactive version of service A on the appliance that remains in the computing environment.

In at least some embodiments, a multi-appliance solution orchestrator (MSO) is provided. Although the MSO is used to facilitate discussion herein, any reference to the MSO is exemplary, and should not be considered limiting of the disclosure, as any solution capable of including the functionality described herein may be utilized. Generally, the MSO may maintain service ownership, service versions, and service relationships with other services. Service ownership indicates which appliances provide a given service in an integrated solution. Service versions indicate the versions of services that are running or idle in the integrated solution. Relationships between services include the priorities and dependencies of the services, such that the MSO can decide which service to activate or deactivate when adding or removing appliances to the integrated solution.

Figure 1:
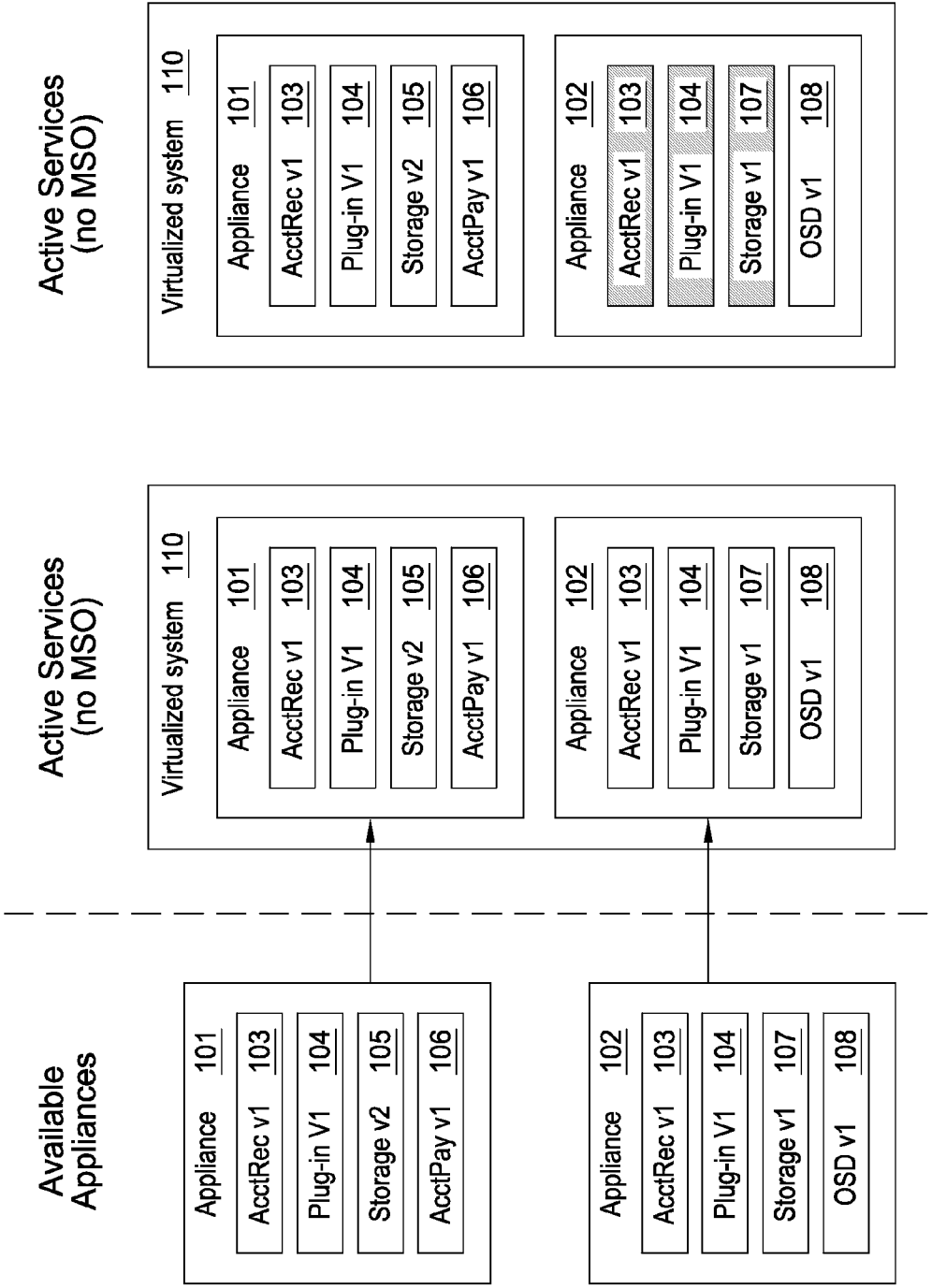
FIG. 1 is a schematic illustrating service management in appliance based solutions, according to one embodiment.

FIG. 1 is a schematic 100 illustrating service management in appliance based solutions, according to one embodiment. As shown, two appliances 101, 102 are available for deployment to a computing environment. Generally, an appliance may be defined as a physical or virtual machine that provides one or more computing services. As shown, appliance 101 includes four services, namely AcctRec v1 (version 1) 103, plug-in v1 104, storage v2 105, and AcctPay v1 106, while appliance 102 includes AcctRec v1 103, plug-in v1 104, storage v1 107, and OSD v1. The services may provide a set of computing services that collectively perform the functionality of the appliance, which in this example may be an accounting appliance. The services may also be in the form of physical or virtual machines. A state of a system when appliances 101, 102 are deployed without the functionality of the MSO is depicted in virtualized system 110. As shown, both appliances 101, 102 have been deployed to the virtualized system, and each service within each respective appliance 101, 102 is active. As such, two instances of plug-in v1 103 and AcctRec v1 103 are executing on the virtualized system, which may waste system resources. Additionally, two versions of the storage service, storage v1 107 and storage v2 105, are executing on appliance 101 and 102, respectively. Therefore, two possibly conflicting versions of the storage service are executing within the virtualized system 110. The possibly conflicting versions of the storage service may therefore utilize twice as many resources than needed to provide the service within the virtualized system 110.

The virtualized system 111 depicts the deployment of the appliances 101, 102 to the same environment using the MSO. As shown, all four services 103-106 of appliance 101 are active, while only OSD v1 108 is active on appliance 102. When deploying the appliances 101, 102, the MSO may identify the duplicate services. In one embodiment, the MSO reference a data store (referred to herein as topology data) which includes a list of active services in the virtualized system 111. The MSO may maintain and update the topology data whenever new services and appliances are added to a given environment. Thus, the MSO may leverage the topology data to determine that the appliances 101 and 102 include duplicate services, and determine that only one instance of each service in the virtualized system 111 is necessary. Therefore, the MSO may cause the services AcctRec v1 103, plug-in v1 104, and storage v1 107 to not be activated on appliance 102, but activate all services on appliance 101, when they are deployed to the virtualized system 111.

FIG. 2 illustrates an example topology data 200, according to one embodiment. Although the topology data 200 is depicted as a table, any format may be used to store the topology data 200. Generally, the topology data 200 may include, without limitation, service ownership, service versions, service activity states, service rules, and service relationships. The MSO may update and modify the topology data 200 whenever services and/or appliances are added to or removed from a given computing environment. When appliances and/or services are deployed to the computing environment, the MSO may retrieve identification information for each service. The identification information may include information on software applications in a system registry, a deployment descriptor, or any other suitable source. One example of a deployment descriptor is an open virtualization format (OVF) descriptor that contains metadata about the service and its contents. The OVF descriptor may include, without limitation, service details, descriptions, virtual hardware requirements, licensing requirements, and the like. The MSO may utilize this information to populate at least some entries in the topology data 200. In addition, in at least some embodiments, a user may supply information included in the topology data 200.

As shown, the topology data 200 includes columns for a service 201, a version 202, an appliance 203, a state 204, a state change 205, and a relationships/dependencies 206. The service 201 column specifies a name for a given service, while the version 202 indicates a version of the service 201. The appliance column 203 indicates which appliance owns (or hosts) a given service, while a state 204 indicates whether the given service is active or inactive. For example, as shown, service K, version 2, is active on appliance D, while service K, version 1, is inactive on appliance C. The state change 205 includes a set of rules which may be applied by the MSO. For example, the state change 205 of version 1 of service L on appliance C specifies that the service can be activated when appliances A and B are down or removed from the computing environment, as both appliances A and B each host version 2 of service L. The relationships/dependencies 206 defines dependencies of the service and/or appliance. As shown, appliance A requires service L, version 2 to be active, while service K, version 2 is dependent on service L, version 2.

Figure 3:
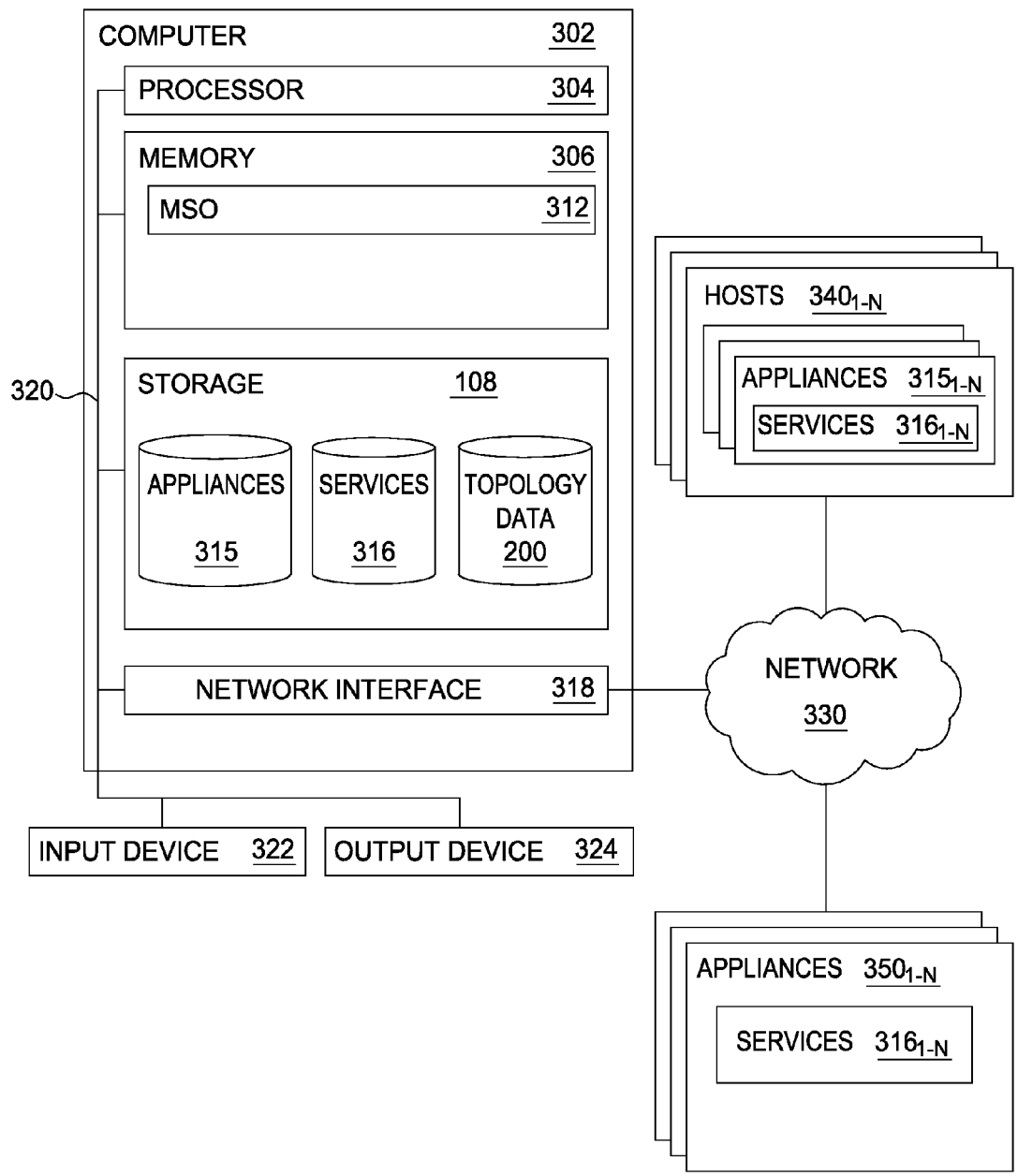
FIG. 3 is a block diagram illustrating a system for service management in appliance based solutions, according to one embodiment.

FIG. 3 is a block diagram illustrating a system 300 for service management in appliance based solutions, according to one embodiment. The networked system 300 includes a computer 302. The computer 302 may also be connected to other computers via a network 330. In general, the network 330 may be a telecommunications network and/or a wide area network (WAN). In a particular embodiment, the network 330 is the Internet. The networked system 300 may be any type of integrated solution, such as a public or private cloud computing environment. As shown, the system 300 includes a plurality of hosts $340_{1-N}$, each of which may include one or more appliances $315_{1-N}$ which execute as virtual machines. The appliances $315_{1-N}$ may include one or more services $316_{1-N}$. In addition, the system 300 may include one or more hardware appliances $350_{1-N}$, which each may include one or more software services $316_{1-N}$. Therefore, appliances executing services may be hardware appliances, such as the appliances 350, or software appliances, such as the appliances $315_{1-N}$.

The computer 302 generally includes a processor 304 connected via a bus 320 to a memory 306, a network interface device 318, a storage 308, an input device 322, and an output device 324. The computer 302 is generally under the control of an operating system (not shown). Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 304 is included to be representative of a single CPU, multiple CPUs, a single CPU having multiple processing cores, and the like. The network interface device 318 may be any type of network communications device allowing the computer 302 to communicate with other computers via the network 330.

The storage 308 may be a persistent storage device. Although the storage 308 is shown as a single unit, the storage 308 may be a combination of fixed and/or removable storage devices, such as fixed disc drives, solid state drives, SAN storage, NAS storage, removable memory cards or optical storage. The memory 306 and the storage 308 may be part of one virtual address space spanning multiple primary and secondary storage devices.

The input device 322 may be any device for providing input to the computer 302. For example, a keyboard and/or a mouse may be used. The output device 324 may be any device for providing output to a user of the computer 302. For example, the output device 324 may be any conventional display screen or set of speakers. Although shown separately from the input device 322, the output device 324 and input device 322 may be combined. For example, a display screen with an integrated touch-screen may be used.

As shown, the memory 306 contains the MSO 312, which is a service that maintains and enforces service rules, service ownership, service states, service versions, and service relationships with other services. When new appliances and/or services are added to or removed from the network system 300, the MSO 312 ensures that the service rules and dependencies are enforced. For example, the rules may indicate that only one active version of service A can be executing in the system 300. When appliance X, including service A is deployed in the system 300, the MSO 312 may reference the topology data 200 to determine whether service A (or a newer version of service A than is included with appliance X) is currently executing in the system 300. If service A is already executing on another appliance, such as appliance Y, then the MSO may restrict activation of service A on the appliance X, such that only one version of the service A is executing in the system 300. If, however, the MSO 312 later determines that appliance Y is removed from the system 300, the MSO 312 may reference the topology data 200, determine that service A is inactive on appliance X, and activate service A on appliance X such that service A remains available in the system 300. In operation, the MSO 312 may also consider performance metrics of the hosts 340, appliances 315, and appliances 350 in determining where to host an active service. For example, when deploying appliance X, the MSO 312 may determine that appliance Y has current CPU, memory, network, and disk I/O utilization levels that are at or near full capacity, or above some predefined threshold. In such a scenario, the MSO 312 may use this information in making the decision to activate service A on appliance X, while deactivating service A on appliance Y, in order to improve performance on appliance Y.

As shown, the storage 308 includes the appliances 315, services 316, and topology data 200. The topology data 200, as previously discussed, may include, without limitation, service ownership, service versions, service activity states, service rules, and service relationships. Generally, the topology data 200 is used in order to ensure that the appropriate services, and appropriate versions thereof, are executing in the system 300. For example, for a rule in the topology data 200 may specify that only a single instance of a payroll service in the services 316 may be active in the system 300 at any given point. Therefore, the topology data 200 may specify which deployed appliance currently owns the active instance of the payroll service, as well as one or more other deployed appliances that include inactive instances of the payroll service. Therefore, when the MSO 312 determines that the payroll service is no longer available, the MSO 312 may reference the topology data 200 in order to identify an inactive instance of the payroll service that be activated. The appliances 315 include virtual appliances that may include one or more software services 316, which collectively perform a specified function. The services 316 may include metadata which may be used by the MSO 312 in order to populate the topology data 200 when services and/or appliances including services are deployed in the system 300.

Figure 4:
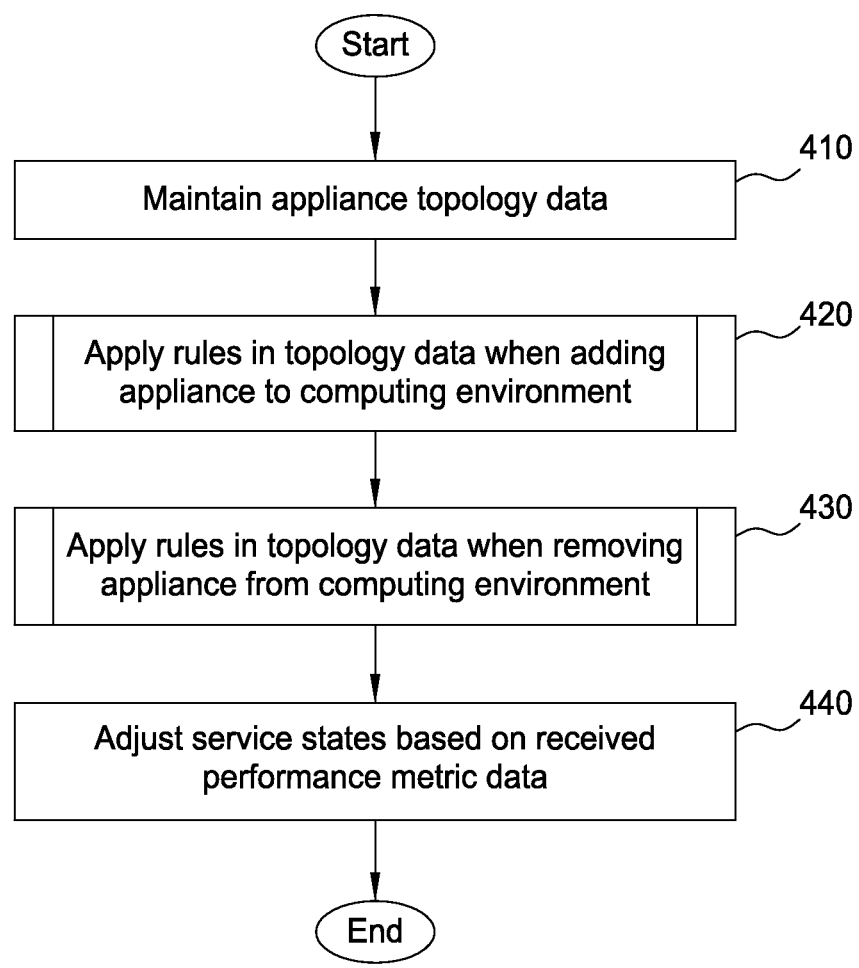
FIG. 4 is a flow chart illustrating a method to manage services in appliance based solutions, according to one embodiment.

FIG. 4 is a flow chart illustrating a method 400 to manage services in appliance based solutions, according to one embodiment. Generally, a system executing the steps of the method 400 ensures that a predefined number of instances of a given service are active in a computing environment, that the correct versions of the services are active, and that service dependencies are maintained in the computing environment. In one embodiment, the MSO 312 performs the steps of the method 400. The method 400 begins at step 410, where the MSO maintains appliance and service topology data. Generally, whenever a service is deployed to the computing environment, the MSO 312 may populate the topology data 200 with descriptive metadata regarding the service and/or appliance, including, without limitation, functionalities, service dependencies, version information, and the like. Likewise, when a service or appliance is removed from the computing environment, the MSO 312 updates the topology data 200 to reflect that the service and/or appliance has been removed, as well as to identify an inactive version of the service that can be activated. At step 420, described in greater detail with reference to FIG. 5, the MSO 312 may apply rules stored in the topology data 200 when adding an appliance and/or service to the computing environment. Generally, enforcing the rules allows the MSO 312 to ensure that the correct number and versions of service are active in the computing environment. At step 430, described in greater detail with reference to FIG. 6, the MSO 312 may apply rules in the topology data 200 when removing an appliance and/or service from the computing environment. Generally, enforcing the rules allows the MSO 312 to ensure that a service remains available in the computing environment, even though the currently active version is being removed. At step 440, the MSO 312 may optionally adjust the states of different services based on performance metric data received from the host machines in the computing environment. For example, if a hypervisor on a host executing service Y indicates that the system is experiencing memory utilization that exceeds a specified threshold, the MSO 312 may deactivate service Y on that host, and cause service Y to be activated on another host that has sufficient computing resources to host service Y. Whenever modifying the activity states of one or more services, the MSO 312 may update the topology data 200 to reflect the change.

Figure 5:
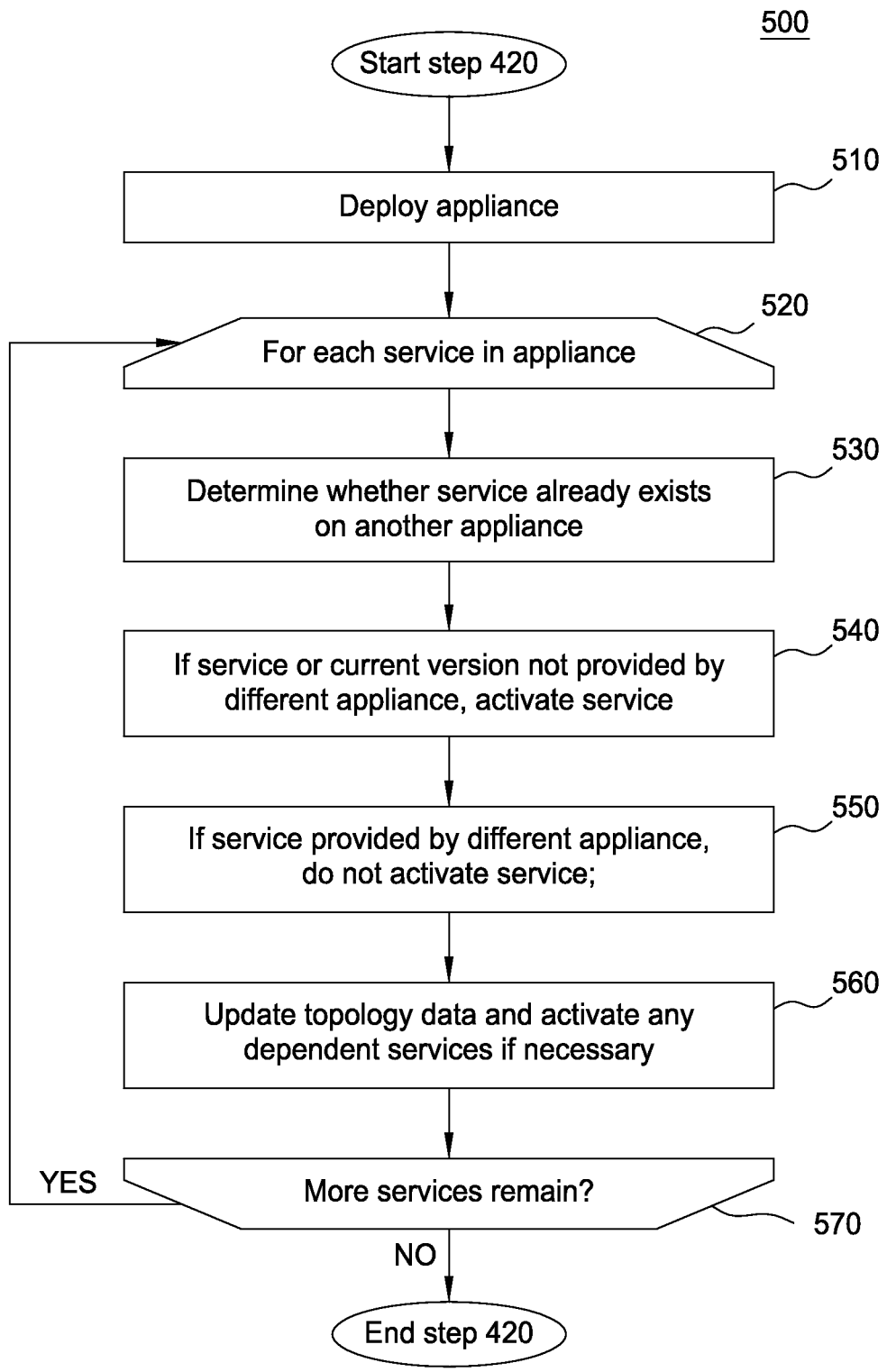
FIG. 5 is a flow chart illustrating a method to apply rules when adding an appliance to a computing environment, according to one embodiment.

FIG. 5 is a flow chart illustrating a method 500 corresponding to step 420 to apply rules when adding an appliance to a computing environment, according to one embodiment. In some embodiments, the MSO 312 performs the steps of the method 500. At step 510, the MSO 312, a designated component in the computing environment, or a user deploys an appliance into the computing environment. At step 520, the MSO 312 executes a loop including steps 530-570 for each service included in the appliance deployed at step 510. At step 530, the MSO 312 may reference the topology data to determine whether the service (or a newer version thereof) exists in the computing environment. At step 540, the MSO 312 activates the deployed service on the deployed appliance upon determining that the service (or a newer version thereof) does not already exist in the computing environment. In some embodiments, a threshold number of instances of the service (greater than one instance) may be permitted in the computing environment. In such embodiments, the MSO 312 may determine, by referencing the topology data 200, whether the threshold number of instances exist in the computing environment, and activate the current service on the deployed appliance if the threshold number of instances do not exist. At step 550, the MSO 312 does not activate the service on the deployed appliance upon determining that the service is provided by a different appliance, or that a more current version of the service exists. At step 560, the MSO 312 may update the topology data 200 to reflect the actions taken with regard to the current service. For example, the MSO 312 may specify that the service exists on the appliance, whether or not the service was activated, one or more rules for the service, dependency information, and activation information. Additionally, if the dependency information indicates that the service (or appliance) requires a dependent service, the MSO 312 may deploy and/or activate the dependent service. At step 570, the MSO 312 determines whether more services remain in the deployed appliance. If more services remain, the MSO 312 returns to step 520. Otherwise, the method ends.

In some embodiments, the MSO 312 may reference system performance metrics in order to determine whether or not to activate a given service on an appliance. For example, if the MSO 312 receives CPU utilization rates from a hypervisor on a host executing the lone active instance of service A, the MSO 312 may determine whether the CPU utilization (or any other performance metric) rates exceed a specified threshold. If the CPU utilization rates exceed the threshold, the MSO 312 may deactivate the currently active instance of service A, and activate service A on the new appliance deployed at step 510. Alternatively, if a hypervisor associated with the appliance deployed at step 510 provides data indicating that system resource utilization exceeds a specified threshold, the MSO 312 may decide not to activate a service on the appliance, and cause the service to be activated on another appliance in the computing environment. Generally, the MSO 312 may be configured to continuously receive performance metric data from host systems in the computing environment, and modify the activity states of each service in the computing environment based on the performance metric data.

Figure 6:
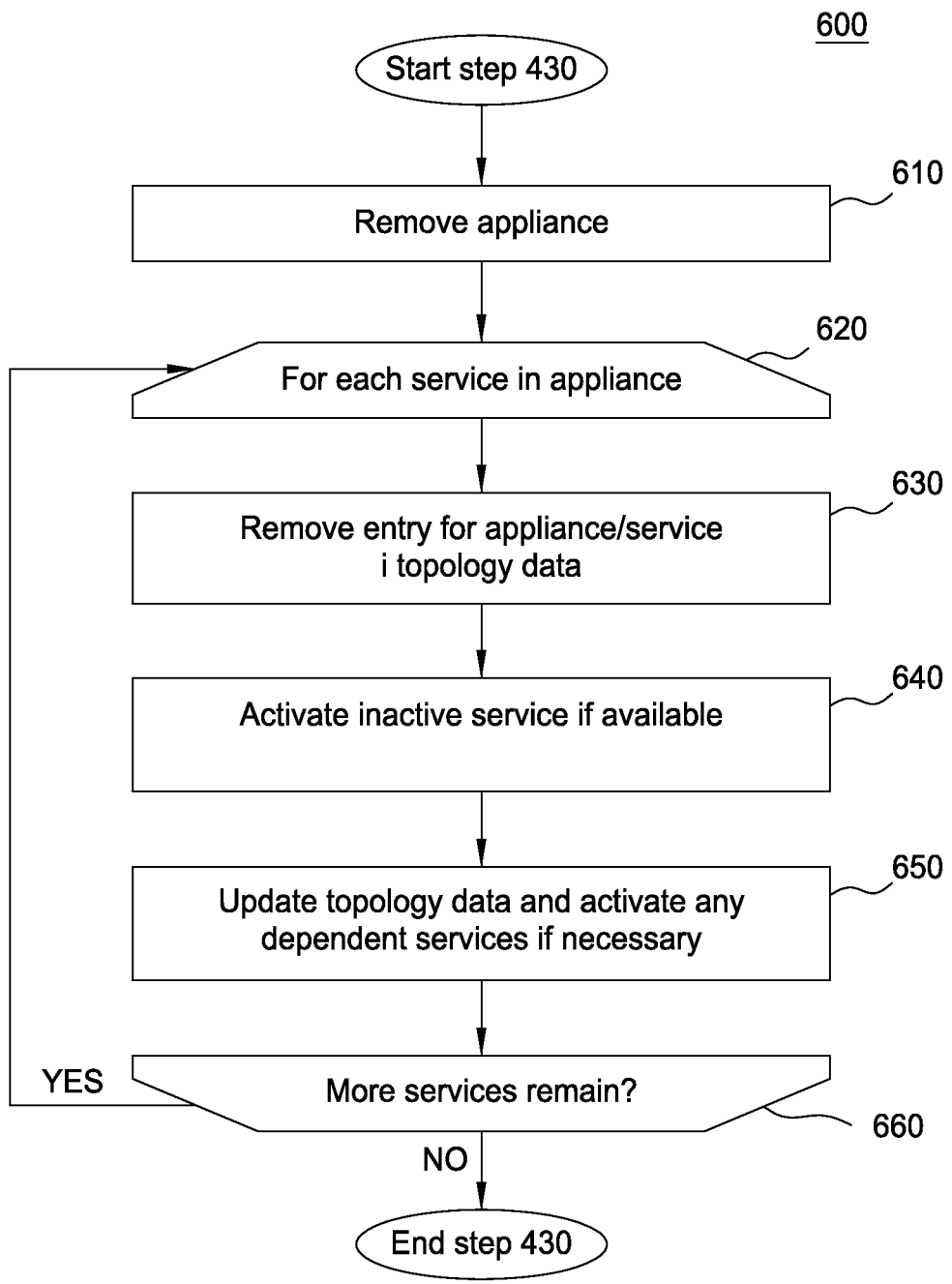
FIG. 6 is a flow chart illustrating a method to apply rules when removing an appliance to a computing environment, according to one embodiment.

FIG. 6 is a flow chart illustrating a method 600 corresponding to step 430 to apply rules when removing an appliance to a computing environment, according to one embodiment. In some embodiments, the MSO 312 performs the steps of the method 600. At step 610, the MSO 312, a designated component in the computing environment, or a user removes an appliance into the computing environment. In addition or alternatively, the MSO 312 at step 610 may determine that an appliance or a service thereon is no longer available. For example, a power outage may take down an appliance or its host, or performance errors may cause the service to be unavailable. At step 620, the MSO 312 executes a loop including steps 630-660 for each service included in the appliance removed or determined to be unavailable at step 610. At step 630, the MSO 312 may remove the entry for the appliance and service in the topology data 200. At step 640, the MSO 312 may activate an inactive service on a different appliance in order to replace the service that is no longer available. At step 650, the MSO 312 may update the topology data, and deploy and/or activate any dependent services if necessary.

Advantageously, embodiments disclosed herein provide techniques to limit or restrict the number of duplicate or shared services across one or more appliances in a computing environment. By maintaining a data store of deployed services, service states, appliances owning the services, and dependency information, embodiments disclosed herein ensure that duplicate, unnecessary services are not activated in the computing environment, saving system resources, and preventing any potential conflicts between duplicate services, or different versions of services.

In the foregoing, reference is made to embodiments of the disclosure. However, it should be understood that the disclosure is not limited to specific described embodiments. Instead, any combination of the features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications or related data available in the cloud. For example, the MSO 312 could execute on a computing system in the cloud and manage the topology data 200. In such a case, the MSO 312 could enforce the rules in the topology data 200 when deploying or removing services and/or appliances, and store updated versions of the topology data 200 at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer program product, comprising:
a non-transitory computer-readable storage medium having computer-readable program code embodied therewith, the computer-readable program code executable by a processor to perform an operation comprising:
deploying a first appliance including a first version of a first service and a first version of a second service, of a plurality of services, to a computing environment including a plurality of appliances, wherein the plurality of appliances comprise at least one virtual appliance and at least one hardware appliance;
determining, for each of the plurality of services in the first appliance, whether each of the respective services is active on at least one other appliance of the plurality of appliances in the computing environment based on a plurality of attributes of each respective service, wherein the plurality of attributes comprise a respective version of each service;
determining that a second version of the first service is active on a second appliance, of the plurality of appliances;
determining, based on the attributes of the first service, that the second version of the first service is an earlier version of the first service than the first version of the first service;
determining that a first rule of a plurality of predefined rules for executing services in the computing environment permits two or more instances of the first version of the second service to execute in the computing environment;
activating, on the first appliance: (i) the first version of the first service, (ii) the first version of the second service, and (iii) the remaining services of the plurality of services that are not in violation of the corresponding rule, wherein the violation of each rule is based on whether the remaining services are active on at least one other appliance of the plurality of appliances;
determining that a second rule of the plurality of predefined rules restricts two or more versions of the first service from executing in the computing environment;
deactivating the second version of the first service on the second appliance based on the second rule.

2. The computer program product of claim 1, wherein the first version of the second service is active on a third appliance, of the plurality of appliances, wherein a data store is configured to maintain the plurality of attributes of each service and the plurality of predefined rules, the operation further comprising:

updating the data store to reflect the deployment of the first appliance including the activation of the first versions of the first and second services on the first appliance; and updating the data store to reflect the deactivation of the second version of the first service on the second appliance.

3. The computer program product of claim 2, wherein the plurality of attributes further comprise: (i) an activity state of each service, (ii) a service dependency of each service, and (iii) an event triggering a change in the activity state of each service.

4. The computer program product of claim 1, the operation further comprising:

removing the first version of the first service from the first appliance and the third appliance;
identifying the second version of the first service on the second appliance of the plurality of appliances; and
activating the second version of the first service on the second appliance.

5. The computer program product of claim 1, the operation further comprising:

upon determining that a resource utilization of a resource of the first appliance exceeds a specified threshold, wherein the resource comprises one or more of: (i) a processor, (ii) a memory, (iii) a storage, and (iv) a network connection:
deactivating the first version of the first service on the first appliance; and
activating the second version of the first service on the second appliance.

6. The computer program product of claim 1, the operation further comprising:

determining, based on the plurality of attributes of each service, that a third service, of the plurality of services included in the first appliance is dependent on the second version of the first service;
deactivating the first version of the first service on the first appliance based on the determined dependency; and
activating the second version of the first service on the second appliance based on the determined dependency.

7. The computer program product of claim 1, wherein the plurality of rules specify a maximum number of active instances of each respective service in the computing environment, the operation further comprising prior to activating the remaining services on the first appliance:

determining, for each of the plurality of remaining services, a count of active instances of the respective service on the plurality of appliances; and
determining, for each of the plurality of remaining services, whether the count of active instances of the remaining service violates the maximum number of instances of the corresponding rule.

8. A system, comprising:

one or more computer processors; and
a memory containing a program which when executed by the one or more computer processors performs an operation, the operation comprising:
deploying a first appliance including a first version of a first service and a first version of a second service, of a plurality of services, to a computing environment including a plurality of appliances, wherein the plurality of appliances comprise at least one virtual appliance and at least one hardware appliance;
determining, for each of the plurality of services in the first appliance, whether each of the respective services is active on at least one other appliance of the plurality of appliances in the computing environment based on a plurality of attributes of each respective service, wherein the plurality of attributes comprise a respective version of each service;
determining that a second version of the first service is active on a second appliance, of the plurality of appliances;
determining, based on the attributes of the first service, that the second version of the first service is an earlier version of the first service than the first version of the first service;
determining that the first version of the second service is active on a third appliance, of the plurality of appliances;
determining that a first rule of a plurality of predefined rules for executing services in the computing environment permits two or more instances of the first version of the second service to execute in the computing environment;
activating, on the first appliance: (i) the first version of the first service, (ii) the first version of the second service, and (iii) the remaining services of the plurality of services that are not in violation of the corresponding rule, wherein the violation of each rule is based on whether the remaining services are active on at least one other appliance of the plurality of appliances;
determining that a second rule of the plurality of predefined rules restricts two or more versions of the first service from executing in the computing environment;
deactivating the second version of the first service on the second appliance based on the second rule.

9. The system of claim 8, wherein the first version of the second service is active on a third appliance, of the plurality of appliances, wherein a data store is configured to maintain the plurality of attributes of each service and the plurality of predefined rules, the operation further comprising:

updating the data store to reflect the deployment of the first appliance including the activation of the first versions of the first and second services on the first appliance; and
updating the data store to reflect the deactivation of the second version of the first service on the second appliance.

10. The system of claim 9, wherein the plurality of attributes further comprise: (i) an activity state of each service, (ii) a service dependency of each service, and (iii) an event triggering a change in the activity state of each service.

11. The system of claim 8, the operation further comprising:

removing the first version of the first service from the first appliance and the third appliance;
identifying the second version of the first service on the second appliance of the plurality of appliances; and
activating the second version of the first service on the second appliance.

12. The system of claim 8, the operation further comprising:

upon determining that a resource utilization of a resource of the first appliance exceeds a specified threshold, wherein the resource comprises one or more of: (i) a processor, (ii) a memory, (iii) a storage, and (iv) a network connection:
deactivating the first version of the first service on the first appliance; and activating the second version of the first service on the second appliance.

13. The system of claim 8, the operation further comprising:
    determining, based on the plurality of attributes of each service, that a third service, of the plurality of services included in the first appliance is dependent on the second version of the first service;
    deactivating the first version of the first service on the first appliance based on the determined dependency; and
    activating the second version of the first service on the second appliance based on the determined dependency.

14. A method, comprising:
    deploying a first appliance including a first version of a first service and a first version of a second service, of a plurality of services, to a computing environment including a plurality of appliances, wherein the plurality of appliances comprise at least one virtual appliance and at least one hardware appliance;
    determining, for each of the plurality of services in the first appliance, whether each of the respective services is active on at least one other appliance of the plurality of appliances in the computing environment based on a plurality of attributes of each respective service, wherein the plurality of attributes comprise a respective version of each service;
    determining that a second version of the first service is active on a second appliance, of the plurality of appliances;
    determining, based on the attributes of the first service, that the second version of the first service is an earlier version of the first service than the first version of the first service;
    determining that a first rule of a plurality of predefined rules for executing services in the computing environment permits two or more instances of the first version of the second service to execute in the computing environment;
    activating, on the first appliance: (i) the first version of the first service, (ii) the first version of the second service, and (iii) the remaining services of the plurality of services that are not in violation of the corresponding rule, wherein the violation of each rule is based on whether the remaining services are active on at least one other appliance of the plurality of appliances;
    determining that a second rule of the plurality of predefined rules restricts two or more versions of the first service from executing in the computing environment;
    deactivating the second version of the first service on the second appliance based on the second rule.

15. The method of claim 14, wherein the first version of the second service is active on a third appliance, of the plurality of appliances, wherein a data store is configured to maintain the plurality of attributes of each service and the plurality of predefined rules, the method further comprising:
    updating the data store to reflect the deployment of the first appliance including the activation of the first versions of the first and second services on the first appliance; and
    updating the data store to reflect the deactivation of the second version of the first service on the second appliance.

16. The method of claim 15, wherein the plurality of attributes further comprise: (i) an activity state of each service, (ii) a service dependency of each service, and (iii) an event triggering a change in the activity state of each service.

17. The method of claim 16, further comprising:
    removing the first version of the first service from the first appliance and the third appliance;
    identifying the second version of the first service on the second appliance of the plurality of appliances; and
    activating the second version of the first service on the second appliance.

18. The method of claim 17, further comprising:
    upon determining that a resource utilization of a resource of the first appliance exceeds a specified threshold, wherein the resource comprises one or more of: (i) a processor, (ii) a memory, (iii) a storage, and (iv) a network connection:
        deactivating the first version of the first service on the first appliance; and
        activating the second version of the first service on the second appliance.

19. The method of claim 18, further comprising:
    determining, based on the plurality of attributes of each service, that a third service, of the plurality of services included in the first appliance is dependent on the second version of the first service;
    deactivating the first version of the first service on the first appliance based on the determined dependency; and
    activating the second version of the first service on the second appliance based on the determined dependency.

* * * * *